Nov. 21, 1933.   M. KRAJAC   1,935,980
FLYWHEEL
Filed Oct. 5, 1932
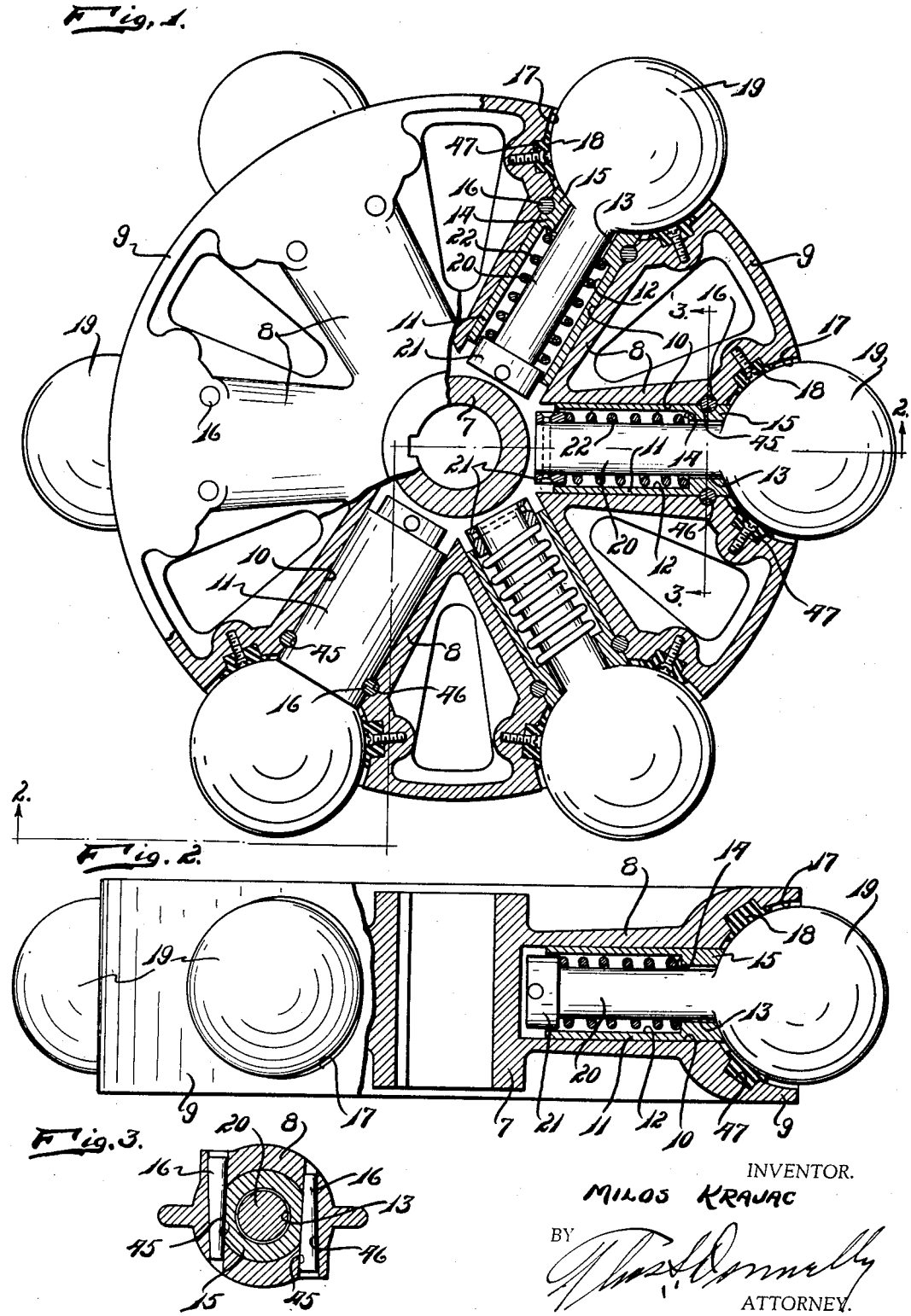
INVENTOR.
MILOS KRAJAC
BY
ATTORNEY.

Patented Nov. 21, 1933

1,935,980

UNITED STATES PATENT OFFICE 1,935,980

FLYWHEEL

Milos Krajac, McDonald, Ohio

Application October 5, 1932. Serial No. 636,372

4 Claims. (Cl. 74—6)

My invention relates to a new and useful improvement in a fly wheel and has for its object the provision of fly wheel which is so constructed and arranged that its various parts assume different relative positions upon different speeds of rotation so as to vary the momentum thereof.

It is an object of the invention to provide a fly wheel so constructed and arranged that the torque resistance thereof, is variable at different speeds of revolution.

It is another object of the invention to provide a fly wheel so constructed and arranged that the various parts thereof, will upon the initial rotation be contained within a predetermined distance of the center and upon increase of speed of rotation increase this distance so that the torque resistance is low at initial starting or low speeds and the momentum is varied.

It is another object of the invention to provide a fly wheel which will be simple in structure, economical of manufacture, durable, highly efficient in use, quiet, and easily and quickly assembled.

Other objects will appear hereinafter.

The invention consists in the combination and arrangement of parts hereinafter described and claimed.

The invention will be best understood by a reference to the accompanying drawing, which forms a part of this specification and in which, Fig. 1 is a side elevational view of the invention with parts broken away and parts shown in section.

Fig. 2 is a view taken on line 2—2 of Fig. 1.

Fig. 3 is a view taken on line 3—3 of Fig. 1.

The fly wheel comprises a hub 7 radiating outwardly from which are spokes 8 connecting to the rim 9. Each of these spokes is provided with a passage 10 formed therethrough in which is positioned a bushing 11. This bushing 11 has the enlarged bore 12 terminating in a small bore 13 at one end to provide adjacent this end of the bushing the shoulder 14 and the head or thickened portion 15. Formed in the periphery of the portion 15 are the grooves 45 adapted to register with the grooves 46 formed in the passage or bore 10 of the spoke 8. Dowell pins 16 engage in the grooves 45 and 46 for locking the bushing 11 in fixed relation to the spoke 8. The outer end of the spoke 8 and the rim 9 is recessed as at 17 to provide a substantially semi-spherical recess communicating with which is the groove 47, in which is embedded the layer 18 of sound deadening material formed from rubber or the like. This layer 18 serves as an engaging portion engaging the ball or sphere 19 which is provided with the radially outwardly projecting stem 20 slidably engaged in the bushing 11. A collar 21 is fixedly mounted on the inner end of the stem 20 and engaging at one end against the collar 21 is a spring 22, the other end of which engages against the shoulder 14 so as to tend to normally retain the sphere or ball 19 in engagement with the strip 18 or positioned inwardly of the recess 17, this recess 17 serving as a pocket for reception of the ball 19. The spring 22 also resists outward movement of the ball 19.

In use the wheel would be fixedly mounted upon a rotating shaft and upon the initial rotation of the shaft the balls 19 would be in the position shown in Fig. 1. When in this position the rotation of the shaft may be more easily effected than when the fly wheel is of greater diameter so that a smaller motor may be used for the initial rotation of the shaft, than would be the case were a larger fly wheel used. As the speed of rotation increases the balls 19 will move radiantly outwardly in response to centrifugal action against the compression of the springs 22. The springs 22 are of sufficient tension so that at pre-determined speeds of rotation the balls 19 will move outwardly to a predetermined distance and remain stationary.

With a fly wheel constructed in this manner I obtain an increase in force due to the outward movement of the balls 19 and a correspondingly increased momentum thus having all of the advantages, when the shaft is rotating at high speeds, of a large fly wheel and when the shaft is initially rotated or rotating at low speeds I have all of the advantages of a small fly wheel.

While I have illustrated and described the preferred form of construction, I do not wish to limit myself to the precise details of structure shown but desire to avail myself of such variations and modifications as come within the scope of the appended claims.

Having thus described my invention what I claim as new and desire to secure by Letters Patent is:—

1. A fly wheel of the class described comprising a hub; a plurality of hollow spokes radiating outwardly from said hub; a rim connecting the outer end of said spokes, the outer end of each of said spokes and said rim at each of said spokes being recessed to provide a substantially semi-spherical pocket; a spherical weight associated with each of said spokes; a stem projecting outwardly from each of said weights and slidably engaged in one of said spokes; and resilient means in each of said spokes for resisting outward movement of said weights.

2. A fly wheel of the class described comprising a hub; a plurality of hollow spokes radiating outwardly from said hub; a rim connecting the outer ends of said spokes, the outer end of each of said spokes and said rim and at each of said spokes being recessed to provide a pocket; a movable weight engageable in each of said pockets; a stem on each of said weights extending inwardly of one of said spokes; a spring in each of said spokes, each engaging one of said stems for resisting the outward movement of said weights.

3. A fly wheel of the class described comprising a hub; a plurality of hollow spokes radiating outwardly from said hub, a rim connecting the outer end of each of said spokes, each of said spokes and said rim at each of said spokes being recessed to provide a pocket; a yieldable engaging member in each of said pockets, a weight adapted for seating in each of said pockets and engaging said engagement member; a stem projecting outwardly from each of said weights and extending inwardly of one of said spokes; a collar on the inner end of said stem; and a spring in each of said spokes and embracing said stem and engaging, at one end, said collar for resisting outward movement of said weight.

4. A fly wheel of the class described comprising a hub; a plurality of hollow spokes radiating outwardly from said hub; a rim connecting the outer end of said spokes each of said spokes, and said rim at each of said spokes, being recessed to provide a pocket; a yieldable member projecting outwardly from the surface of said pockets; a movable weight engageable in said pockets and with said engagement member; a bushing in each of said spokes provided with a shoulder adjacent the outer end; a stem on each of said weights projecting slidably inwardly of said bushing; a collar on the inner end of said stem; and a spring embracing said stem and engaging, at one end, said collar and, at the other end said shoulder.

MILOS KRAJAC.